3,184,511
PURIFICATION PROCESS FOR 4-ISOPROPYL-
AMINODIPHENYLAMINE
Morfydd Ann Bevan and John Mullan, Manchester, England, assignors to Imperial Chemical Industries Limited, London, England, a corporation of Great Britain
No Drawing. Filed Aug. 3, 1962, Ser. No. 214,481
Claims priority, application Great Britain, Aug. 18, 1961, 29,866/61
6 Claims. (Cl. 260—576)

This invention relates to a process for the purification of aromatic amines and more particularly to a process for the treatment of isopropylaminodiphenylamine.

4-isopropylaminodiphenylamine is an important antioxidant and antiozonant for use in rubber but has the disadvantage that in the state of purity normally obtained it has an obnoxious odour which renders the procedure of incorporation into rubber both unpleasant and hazardous.

We have now discovered that if 4-isopropylaminodiphenylamine is heated with sulphur or a sulphur-bearing substance not only is the obnoxious odour removed but the resulting 4-isopropylaminodiphenylamine does not develop the odour on further storage. This treatment does not affect in any way the performance of the 4-isopropylaminodiphenylamine as antioxidant or antiozonant in rubber.

According to our invention therefore we provide a process for the treatment of 4-isopropylaminodiphenylamine to destroy obnoxious impurities which comprises heating the isopropylaminodiphenylamine with sulphur or a sulphur-bearing substance.

The sulphur-bearing substance should contain loosely bound sulphur which is readily liberated, for example by heat, or abstracted by the impurities in the isopropylaminodiphenylamine. As sulphur-bearing substances there may be mentioned sulphides and disulphides such as tetramethylthiuran monosulphide and disulphide, polysulphides such as tetrasulphides, thioureas, isothiocyanates, thiurams, sulphenamides, and mercaptans.

The process may be carried out by heating the mixture of sulphur or sulphur-bearing substance and isopropylaminodiphenylamine to a temperature above its melting point, or by adding sulphur or a sulphur-bearing substance to stirred molten isopropylaminodiphenylamine, or by heating a solution of the sulphur or sulphur-bearing substance and the isopropylaminodiphenylamine in a solvent such as acetone.

The presence of solvent is of assistance in mixing the sulphur or sulphur-bearing substance with the 4-isopropylaminodiphenylamine. It is usually convenient to carry out the treatment with sulphur or the sulphur-bearing substance on the reaction product obtained from the hydrogenation of 4-aminodiphenylamine/acetone mixtures, part of the unchanged acetone being first removed for example by distillation if desired.

When solvents are present it is preferred to use sulphur-bearing substances of the type exemplified by tetramethylthiuram disulphide since under these conditions other types of sulphur-bearing substances tend to produce traces of hydrogen sulphide, particularly if temperatures in the higher part of the useful range are used.

The treatment may be carried out at any temperature between 20° C., and 250° C. and preferably between 55° C. and 120° C. At the preferred temperatures a heating time of up to 3 hours is usually adequate.

The amount of sulphur or sulphur-bearing substance may be from 0.001% to 10% of the weight of isopropylaminodiphenylamine but amounts of from 0.2% to 2% are preferred, although this will depend upon the amount of impurity present.

The invention is illustrated but not limited by the following examples in which all parts and percentages are by weight unless otherwise stated.

Example 1

A mixture of 20 parts of crude 4-isopropylaminodiphenylamine and 0.2 part of sulphur is stirred for three hours at a temperature between 150° and 160° C., and is then distilled at a temperature between 200° and 225° C. under a pressure of 15 mm. of mercury. The treated mixture both before and after distillation is free from unpleasant odour and does not develop any odour on storage in the air. The crude 4-isopropylaminodiphenylamine before heating with sulphur has an obnoxious odour similar to that of a carbylamine.

Example 2

A mixture of 100 parts of crude 4-isopropylaminodiphenylamine and 1 part of sulphur is stirred for 3 hours at a temperature between 100 and 110° C., and then cooled. The mixture is free from unpleasant odour and does not develop an unpleasant odour on storage in air for 6 weeks. When tested as an antioxidant/antiozonant in rubber the treated isopropylaminodiphenylamine does not behave differently from untreated material.

Example 3

A mixture of 300 parts of crude 4-isopropylaminodiphenylamine dissolved in 900 parts acetone is stirred with 6 parts of tetramethylthiuramdisulphide for 1 hour. The acetone is removed by distillation, initially at atmospheric pressure to a temperature of 120° C., and finally under a pressure of 20 mm. mercury at 160° C. for 1 hour. The mixture is then cooled. The treated product is free from unpleasant odour and does not develop any odour on storage in the air.

Example 4

A mixture of 300 parts of crude 4-isopropylaminodiphenylamine dissolved in 450 parts acetone is stirred with 6 parts of tetramethylthiuramdisulphide for 1 hour. The acetone is removed by distillation, initially at atmospheric pressure to a temperature of 120° C., and finally under vacuum (20 mm. mercury) at 160° C. for 1 hour. The mixture is then cooled. The treated product is free from unpleasant odour and does not develop any odour on storage in the air.

Example 5

A mixture of 300 parts of crude 4-isopropylaminodiphenyl amine and 6 parts of dipentamethylenethiuramtetrasulphide is stirred for 1 hour at a temperature between 100 and 110° C, and then cooled. The treated mixture is free from unpleasant odour and does not develop any odour on storage in the air.

Example 6

A mixture of 300 parts of crude 4-isopropylaminodiphenylamine and 6 parts of tetramethylthiuramdisulphide is stirred for 1 hour at a temperature between 100 and 110° C. and then cooled. The treated mixture is free from unpleasant odour and does not develop any odour on storage in the air.

Example 7

A mixture of 300 parts of crude 4-isopropylaminodiphenylamine and 10 parts of tetraisopropyl-bis-thiophosphoryldisulphide is stirred for one hour at a temperature between 100 and 110° C. and then cooled. The treated mixture is free from unpleasant odour on storage in air.

What we claim is:
1. A process for the treatment of 4-isopropylaminodiphenylamine to destroy obnoxious impurities which com- prises heating the isopropylaminodiphenylamine at a temperature between 20° C. and 250° C. with a member selected from the group consisting of sulphur and a sulphur-bearing substance containing loosely bound sulphur, said member being present in amounts of 0.001–10% by weight of said 4-isopropylaminodiphenylamine.

2. A process according to claim 1 wherein the sulphur-bearing substance containing loosely bound sulphur is selected from the group consisting of thiuram monosulphide, thiuram disulphide and thiuram polysulphide.

3. The process according to claim 1 wherein the sulphur-bearing substance containing loosely bound sulphur is tetramethylthiuramdisulphide.

4. The process according to claim 1 wherein the sulphur-bearing substance containing loosely bound sulphur is dipentamethylenethiuramtetrasulphide.

5. The process according to claim 1 wherein the sulphur-bearing substance containing loosely bound sulphur is tetraisopropyl-bis-thiophosphoryldisulphide.

6. The process according to claim 1 wherein the 4-isopropylaminodiphenylamine is dissolved in acetone.

References Cited by the Examiner
UNITED STATES PATENTS

| | | | |
|---|---|---|---|
| 2,328,759 | 9/43 | Wahl | 260—576 XR |
| 2,905,655 | 9/59 | Albert | 260—576 XR |
| 3,035,014 | 5/62 | Popoff et al. | 260—576 XR |
| 3,057,819 | 10/62 | Kibler | 260—576 XR |

CHARLES B. PARKER, *Primary Examiner.*